United States Patent [19]

Shepler et al.

[11] Patent Number: 4,953,604
[45] Date of Patent: Sep. 4, 1990

[54] TREAD FOR A UNIDIRECTIONAL PNEUMATIC TIRE

[75] Inventors: Peter R. Shepler, Stow; Nathan A. Gammon, Akron; William M. Hopkins, Hudson; James E. Koerner, Uniontown; Charles K. Schmalix, Canal Fulton, all of Ohio

[73] Assignee: The Goodyear Tire & Rubber Company, Akron, Ohio

[21] Appl. No.: 357,147

[22] Filed: May 25, 1989

[51] Int. Cl.$^5$ .............................................. B60C 11/04
[52] U.S. Cl. ............................ 152/209 A; 152/209 R; D12/146
[58] Field of Search .......... 152/209 A, 209 R, 209 D, 152/209 WT; D12/146–151

[56] References Cited

U.S. PATENT DOCUMENTS

| | | |
|---|---|---|
| D. 223,599 | 5/1972 | Busch et al. |
| D. 266,919 | 11/1982 | Bennett . |
| D. 283,499 | 4/1986 | Hammond . |
| D. 284,178 | 6/1986 | Kawabata et al. |
| 2,154,290 | 4/1939 | Snyder . |
| 3,674,077 | 7/1972 | Verdier . |
| 4,424,843 | 1/1984 | Fontaine et al. |
| 4,424,844 | 1/1984 | Fontaine . |
| 4,456,046 | 6/1984 | Miller . |
| 4,470,443 | 9/1984 | Eraud . |
| 4,545,415 | 10/1985 | Landner et al. |
| 4,574,856 | 3/1986 | Braas . |
| 4,722,378 | 2/1988 | Carolla et al. |

FOREIGN PATENT DOCUMENTS 121506  5/1988  Japan ..................... 152/209 D

OTHER PUBLICATIONS

Ward's Auto World, Feb. 1989, p. 102.
Modern Tire Dealer, Feb. 1988, p. 46.

*Primary Examiner*—Michael W. Ball
*Assistant Examiner*—Geoffrey L. Knable
*Attorney, Agent, or Firm*—L. R. Drayer

[57] ABSTRACT

A tread for a unidirectional pneumatic tire has first, second and third circumferentially extending zones. The edges of the zones are parallel to the equatorial plane of the tire. The width of the first zone is between 25% and 50% of the tread width, the width of the second zone is between 15% and 35%, and the width of the third zone is between 25% and 50%. The first zone has substantially aligned lateral wide groove segments extending across the width of the first zone. The segments form an angle between 70 and 90 degrees with a plane in the first zone parallel to the equatorial plane. The second zone has substantially aligned lateral wide groove segments extending across the width of the second zone. The segments form an angle between 10 and 45 degrees with a plane in the second zone parallel to the equatorial plane. The third zone has substantially aligned lateral wide groove segments extending across the width of the third zone which are generally perpendicular to the lateral wide groove segments of the second zone. The segments form an angle between 45 and 70 degrees with a plane in the third zone parallel to the equatorial plane.

12 Claims, 5 Drawing Sheets

TREAD FOR A UNIDIRECTIONAL PNEUMATIC TIRE

BACKGROUND OF THE INVENTION

1. Field of Invention

This invention relates generally to pneumatic tires and more specifically to asymmetrical, directional tires.

2. Description of Related Art

In automotive vehicles, proper traction between the tire and the road surface is necessary for effective operation of the vehicle. Tires are required to provide good traction under a variety of different operating conditions. For example, when the vehicle accelerates, the tire must transfer the force to the road surface with a minimum of slippage to achieve maximum acceleration. Similarly, when the vehicle is decelerating or braking, the tire must transmit this force to the road with a minimum of slippage to maintain controlled operation of the vehicle. When cornering, the tire is required to maintain good contact with the road surface despite the weight of the vehicle shifting on its chassis and the presence of cornering forces. The presence of rain, snow or other friction-reducing substance on the road surface makes all of the above traction objectives more difficult to achieve.

Tire designers have sought to design tread patterns to improve traction between the tire and the road surface. Some have been specifically directed toward good traction under a variety of road surface conditions such as U.S. Pat. No. 4,545,415 to Lindner et al. and U.S. Pat. No. 3,674,077 to Verdier. Both Lindner et al. and Verdier disclose tire tread designs featuring grooves which extend generally laterally across the tire tread from tread edge to tread edge. Other tread designs feature directional treads which are designed to rotate in one direction only, such as U.S. Pat. No. 284,178 to Kawabata et al. and Austrian Patent No. 147,223. Still other tread designs seek traction advantages through asymmetric tread designs such as U.S. Pat. No. Des. 223,599 to Busch et al.

While tire tread designers have met with some success, further improvements are desirable in providing good traction under a variety of operating and road surface conditions.

SUMMARY OF THE INVENTION

The invention disclosed and claimed herein is a tread for a unidirectional pneumatic tire designed for use on paved road surfaces. The tread, when mounted on a casing, features first, second and third circumferentially extending zones whose edges are parallel to the equatorial plane of the tire. The second zone is disposed between the first and third zone. The width of the first zone is between 25% and 50% of the tread width, the width of the second zone is between 15% and 35% of the tread width, and the width of the third zone is between 25% and 50% of the tread width. The first zone has substantially aligned lateral wide groove segments extending across the width of the first zone. The lateral wide groove segments, over a majority of their length in the first zone, form an angle between 70 degrees and 90 degrees with a plane in the first zone which is parallel to the equatorial plane.

The second zone features substantially aligned lateral wide groove segments extending across the width of the second zone. The lateral wide groove segments, over a majority of their length in the second zone, form an angle between 10 degrees and 45 degrees with a plane in the second zone parallel to the equatorial plane of the tire.

The third zone has substantially aligned lateral wide groove segments extending across the width of the third zone, generally perpendicular to the lateral wide groove segments of the second zone.

The lateral wide grooves, of the third zone, over a majority of their length in the third zone, form an angle between 45 degrees and 65 degrees with a plane in the third zone parallel to the equatorial plane.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENTS

Figure 1:
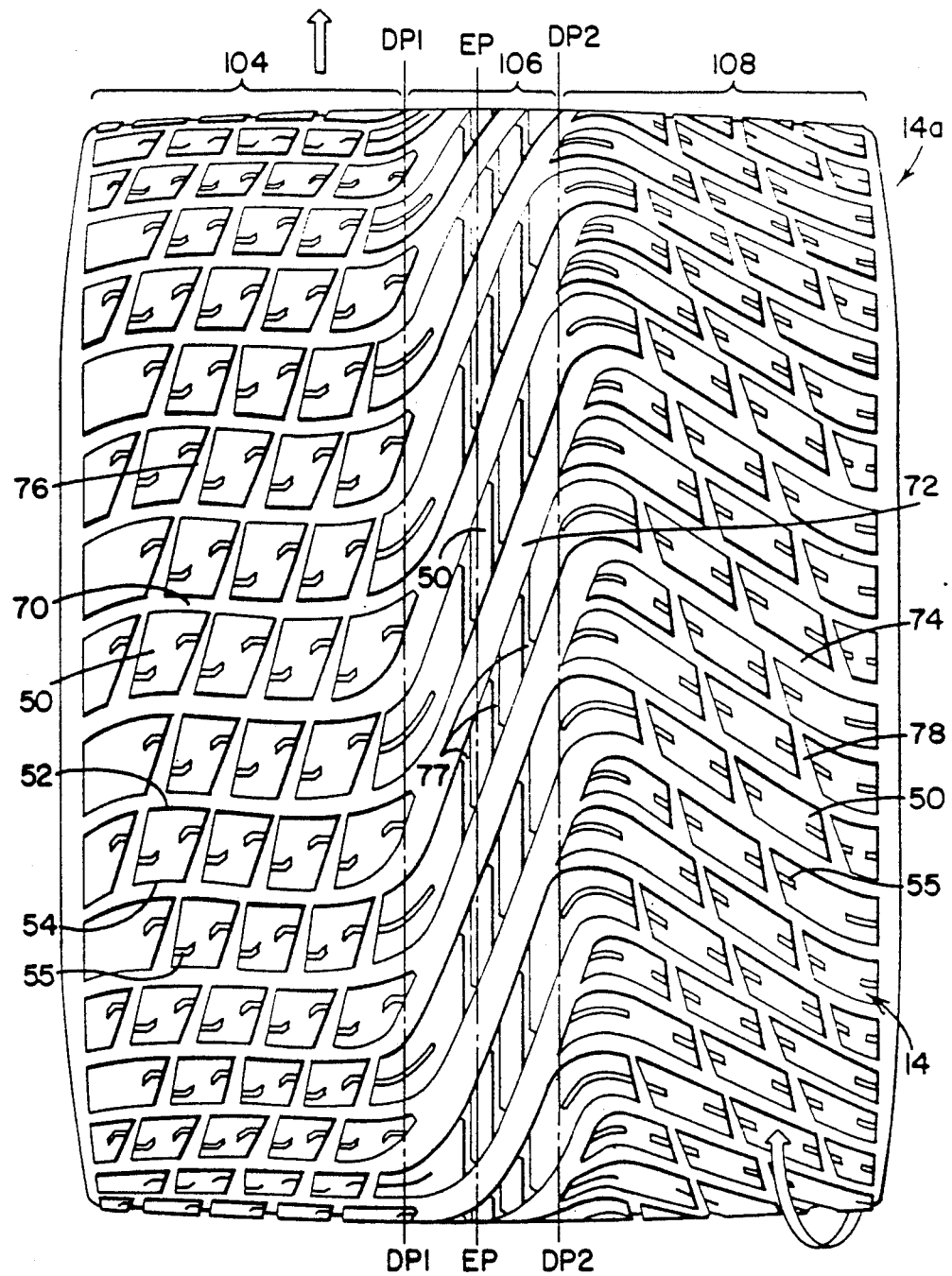
FIG. 1 is a plan view of a right tire with a tread according to the present invention with the normal, forward orientation being toward the top of the page in the direction of the arrow.

The invention also may be better understood in the context of the following definitions, which are applicable to both the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Equatorial plane (EP)" means the plane perpendicular to the tire's axis of rotation and passing through the center of its tread.

"Dividing Plane (DP)" means the plane perpendicular to the tire's axis of rotation that divides a tire tread according to the present invention into zones.

"Tread" means a molded rubber component which, when bonded to a tire casing, includes that portion of the tire that comes into contact with the road when the tire is normally inflated and under normal load.

"Tread width" means the arc length of the tread surface in the axial direction, that is, in a plane passing through the axis of rotation of the tire.

"Casing" means the carcass, belt structure, beads, sidewalls, and all other components of the tire excepting the tread and undertread. The casing may be new, unvulcanized rubber or previously vulcanized rubber to be fitted with a new tread.

"Groove" means an elongated void area in a tread that may extend circumferentially or laterally about the tread in a straight, curved, or zig-zag manner. Circumferentially and laterally extending grooves sometimes have common portions and may be subclassified as "wide", "narrow", or "slot". A "slot" is a groove having a width in the range from about 0.2% to 0.8% of the tread width, whereas a "narrow groove" has a width in the range from about 0.8% to 2% of the tread width and a "wide groove" has a width greater than 2% thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of the tread regions in which they are located. Slots often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Normal load" refers to the specific design inflation pressure and load assigned by the appropriate standards organization for the service condition for the tire.

"Axial" and "axially" are used herein to refer to lines or directions that are parallel to the axis of rotation of the tire.

"Radial" and "radially" are used to mean directions radially toward or away from the axis of rotation of the tire.

"Unit tread pressure" means the radial load borne per unit area (square centimeter or square inch) of the tread surface when that area is in the footprint and the tire is loaded.

"Footprint" means the contact patch or area of contact of the tire tread with a flat surface under normal load and pressure or under specified load, pressure and speed conditions.

"Net-to-gross ratio" means the ratio of the tire tread rubber that makes contact with the road surface while in the footprint, divided by the area of the tread in the footprint, including non-contacting portions such as grooves.

Figure 2:
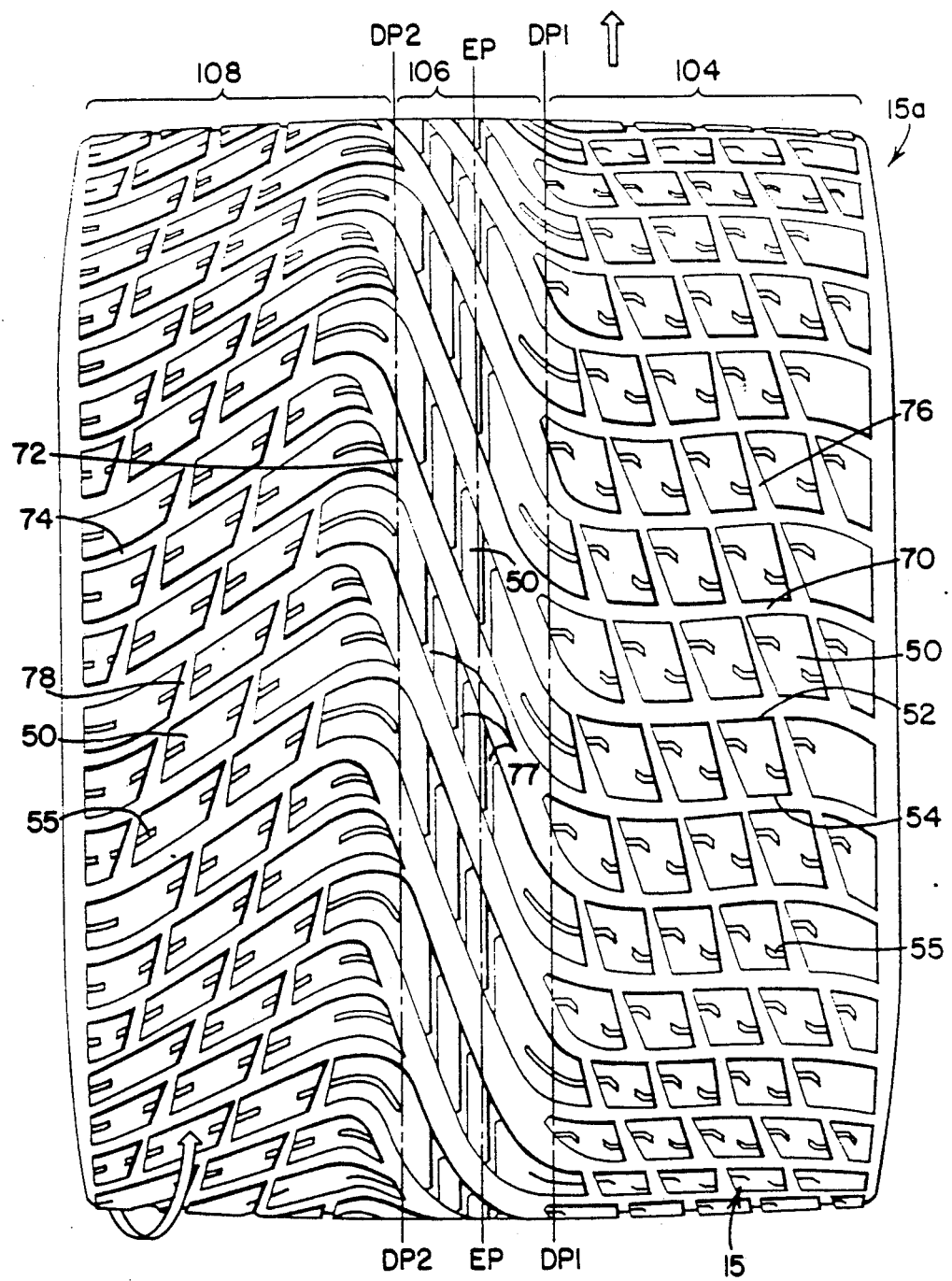
FIG. 2 is a plan view of a left tire with a tread according to the present invention with the normal, forward orientation being toward the top of the page in the direction of the arrow.

In the drawings, the same numerals are used for the same components or items in the several views. With particular reference now to FIGS. 1 and 2, there is illustrated a tread 14, 15 according to the present invention which is mounted on a tire 14a, 15a. In a new tire application, the tread 14, 15 is attached to a tire casing which has not been vulcanized. The tire casing and tread are vulcanized together in a mold, creating a new tire. In a retreading application, the tread can be "precured", that is vulcanized prior to being bonded to the casing being retreaded. Alternatively, the tread pattern can be formed and the tread bonded to the casing in a single "mold-cure" retreading operation. For "precured" retreading purposes, the tread may be in the form of a hoop or may be in the form of a flat slab which is then wrapped around the circumference of the tire casing.

The tread 14, 15 is characterized by first, second and third circumferentially extending zones 104, 106, 108. The zones are separated by dividing planes DP1, DP2. The dividing planes are perpendicular to the tire's axis of rotation and parallel to the tire's equatorial plane EP. The width of the first zone, is between 25% and 50% of the tread width. In the preferred embodiment, the width of the first zone is equal to 37.5% of the tread width. The width of the second zone is between 15% and 35%, and is preferably equal to 25% of the tread width. The width of the third zone is between 25% and 50% of the tread width and preferably is equal to 37.5% of the tread width.

The first zone 104 is characterized by substantially aligned lateral wide groove segments 70 which extend across the width of the first zone. The lateral wide groove segments 70, over a majority of their length in the first zone, form an angle between 70 degrees and 90 degrees with a plane in the first zone parallel to the equatorial plane EP. In the preferred embodiment, the lateral wide groove segments form an angle of 90 degrees with the plane in the first zone parallel to the equatorial plane.

The second zone 106 is also characterized by substantially aligned lateral wide groove segments 72 extending across the width of the second zone. The lateral wide groove segments 72, over a majority of their length in the first zone, form an angle between 10 degrees and 45 degrees with a plane in the second zone parallel to the equatorial plane EP. In the preferred embodiment, the lateral wide groove segments 72 of the second zone 106 form an angle of 23 degrees with a plane in the second zone parallel to the equatorial plane.

The third zone 108 is also characterized by substantially aligned lateral wide groove segments 74 extending across the width of the third zone which are generally perpendicular to the lateral wide grooves (72 of the second zone 106). The lateral wide groove segments 74, over a majority of their length in the third zone, form an angle between 45 degrees and 70 degrees with a plane in the third zone parallel to the equatorial plane EP. The angle of the lateral wide groove segments of the third zone are smaller than the angle of the lateral wide groove segments of the first zone. In the preferred embodiment, the lateral wide groove segments 74 of the third zone 108 form an angle of 59 degrees with a plane in the third zone parallel to the equatorial plane.

The lateral wide grooves 70 of the first zone 104 and the lateral wide grooves 74 of the third zone 108 merge into the lateral wide grooves 72 of the second zone 106.

Figure 3:
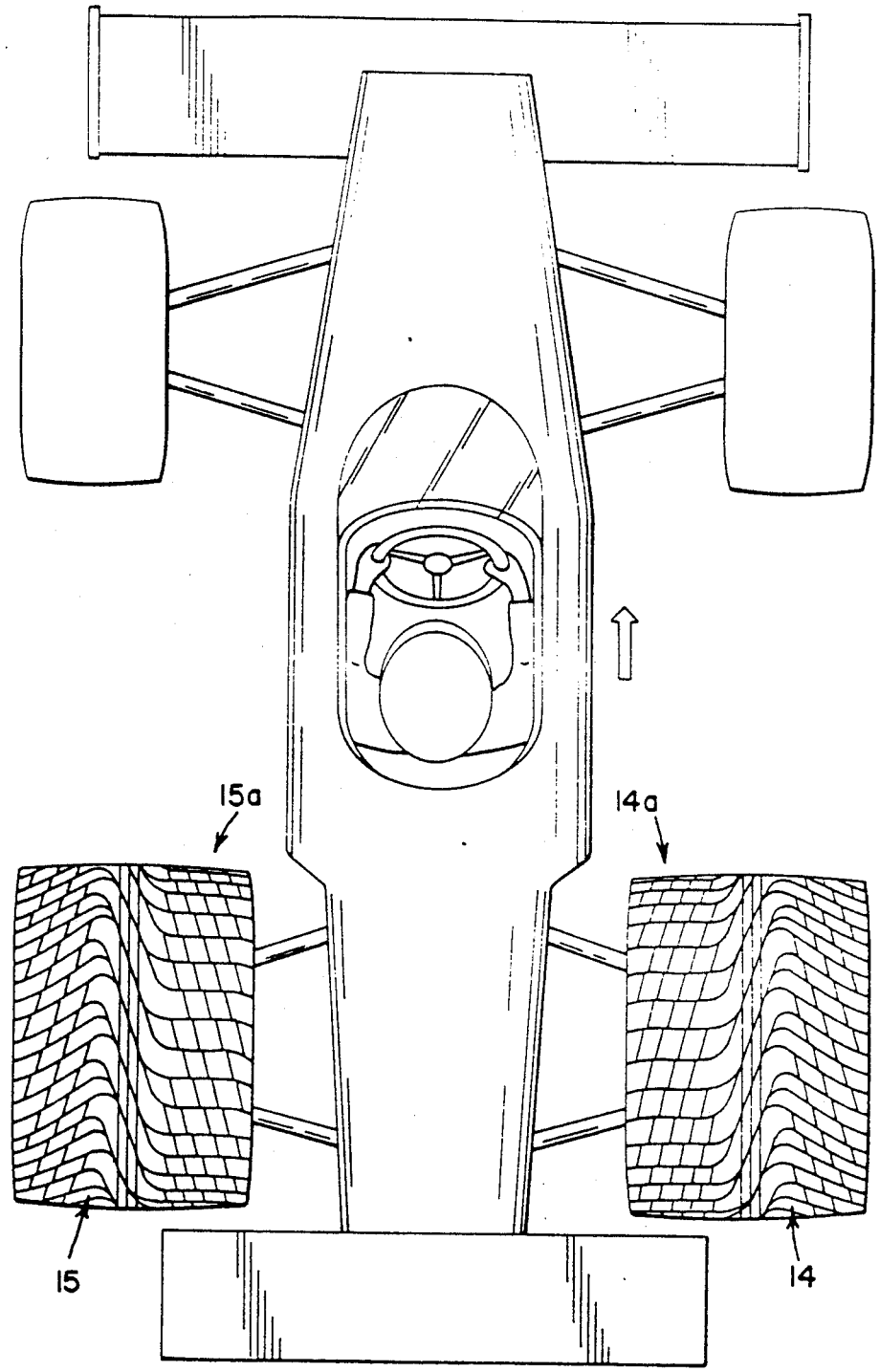
FIG. 3 is a plan view of a vehicle fitted with tire treads according to the present invention mounted on the rear axle of the vehicle.

A tread 14, 15 according to the present invention is a directional, asymmetric tread design. The arrow shown in FIGS. 1 and 2 illustrates the direction of the tire when in normal, forward use. As shown in FIG. 3, preferably the tire will be mounted on the vehicle so that the first zone 104 will be located between the second zone 106 and the vehicle. For example, the tread 14 shown in FIG. 1 is designed for use on the right side of the vehicle while the tread 15 shown in FIG. 2 is designed to be used on the left side of the vehicle.

This orientation makes best use of the intended functions of each zone. The first zone 104 is designed to provide longitudinal traction, especially during acceleration. The primary purpose of the third zone 108 is to provide lateral traction for cornering and to prevent lateral sliding. The nearly perpendicular relationship between the grooves 72 of the second zone 106 and the grooves 74 of the third zone 108 is designed to inhibit lateral sliding of the tires 14a, 15a during turns while continuing to provide good longitudinal traction for acceleration.

The net-to-gross ratio of each zone is at least 3% different than the net-to-gross ratio of the other zones. The net-to-gross ratio of the first zone 104 is between 60% and 75% while the net-to-gross ratio of the second zone 106 is between 40% and 60% and the net-to-gross ratio of the third zone 108 is between 54% and 68%. Preferably, the net-to-gross ratio of the first zone 104 is 67%, the net-to-gross ratio of the second zone 106 is 50% and the net-to-gross ratio of the third zone is equal to 61%. The net-to-gross ratio of each zone is at least 5% different than the other zones.

Net-to-gross ratios are important factors determining a tire's ability to provide good traction under wet or slippery road conditions. To adequately deal with wet road conditions in the footprint of a tire, a tread design must either move standing water from the footprint through groove paths or absorb the water and hold it in the void areas of the tread, allowing the remaining areas of the tread to maintain good contact with the road surface. A low net-to-gross ratio improves a tire's ability to absorb and hold water while in the footprint of the tire. However, a high net-to-gross ratio provides other performance objectives such as good tread wear and stability. Generally speaking, the higher the tread unit pressure, the greater the ability for the tread to squeeze water out of the footprint and provide good contact. Therefore, points of low unit tread pressure require a lower net-to-gross ratio to provide good traction. For the reasons stated above, in the preferred embodiment of a tread according to the present invention, the center of pressure is located in the first zone, which has the higher net-to-gross ratio.

Figure 4:
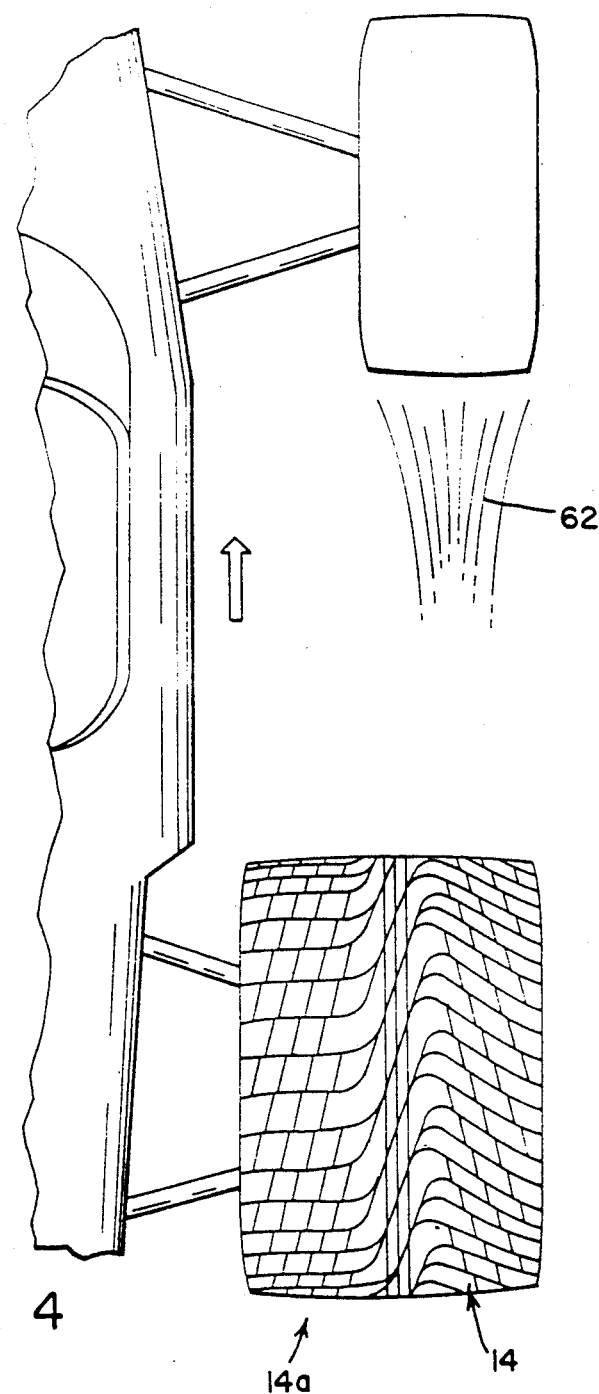
FIG. 4 is an enlarged plan view of a vehicle with tire treads tire according to the present invention mounted on the rear axle of the vehicle.

In the preferred embodiment, the treads 14, 15 are mounted on the rear axle of a vehicle as shown in FIGS. 3 and 4. In this embodiment, the treads 14, 15 are wider than the treads used on the front tires. This difference in the widths of the front and rear tires causes the net-to-gross ratio differences among the zones to be more important. Because the spray 62 from the front tire can partially fill the grooves 72, 74, 77, 78 of the second and third zones 106, 108 before that portion of the tread 14, 15 can even enter the footprint, the net-to-gross ratio of the second and third zones, 106, 108 must be lower than that of the first zone 104. The lower net-to-gross ratios of the second and third zones enables them to accommodate the additional water due to the front tire. In the preferred embodiment, the front tire is 10 inches wide and the rear tire is 16 inches wide. The first zone 104 is 6 inches wide, the second zone is 4 inches wide and the third zone 108 is 6 inches wide.

The lateral wide groove segments 70 of the first zone 104 are intersected by other wide groove segments 76. The other wide groove segments 76 form an angle between 10 degrees and 45 degrees with a plane in the first zone which is parallel to the equatorial plane of the tire. In the preferred embodiment, the other wide groove segments 76 form an angle of 20 degrees with the plane in the first zone which is parallel to the equatorial plane.

The lateral wide groove segments 72 of the second zone 106 are also intersected by other wide groove segments 77. These wide groove segments 77 form an angle between 0 degrees and 10 degrees with a plane in the second zone which is parallel to the equatorial plane. In the preferred embodiment, these wide groove segments 77 form an angle of 0 degrees with a plane in the second zone parallel to the equatorial plane.

The lateral wide groove segments 74 of the third zone 108 are intersected by other wide groove segments 78. These other wide groove segments 78 form an angle between 10 degrees and 35 degrees with a plane in the third zone that is parallel to the equatorial plane. In the preferred embodiment, these wide groove segments 78 form an angle of 22 degrees with a plane in the third zone parallel to the equatorial plane.

The intersection of the lateral wide groove segments 70 of the first zone 104, the lateral wide groove segments 72 of the second zone 106, and the lateral wide groove segments 74 of the third zone 108 by the other wide groove segments 76, 77, 78 form blocks 50. The blocks in the first zone are generally in the shape of a trapezoid. The blocks in the second and third zones are generally in the form of a parallelogram. The leading edge 52 of a block 50 contacts the road surface prior to the trailing edge 54 of the block when the tire is rotating in its forward direction. The leading edge 52 of the blocks 50 in the first zone 104 is wider than the trailing edge 54 of the blocks 50 in the first zone. The wider leading edge is designed to provide improved traction for longitudinal acceleration.

Figure 5:
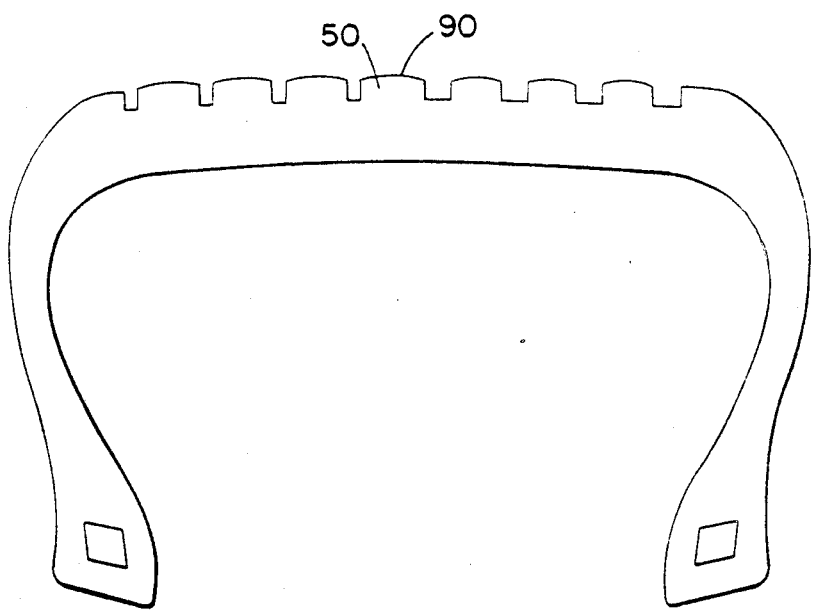
FIG. 5 is a cross-sectional view of a tire with a tread according to the present invention.

With reference to FIG. 5, the radially outermost surface 90 of the block 50 is convexly curved in the radially outward direction. In the preferred embodiment, this curvature in the axial direction only; the circumferential direction has no curvature apart from the usual curvature associated with a round tire. The curvature of the surface of the element helps move water from the center of the block to the tread groove. The curvature shown in FIG. 5 is exaggerated for clarity. In the preferred embodiment, the actual radius of curvature for the block surface is about 4 inches With reference to FIGS. 1 and 2, the blocks 50 in the first and third zones 104, 108 have slots 55. The slots provide paths for water to move from beneath the block to the groove.

Based on the foregoing description of the invention, what is claimed is:

1. A tread for unidirectional pneumatic tire, the tire being for use on paved road surfaces, the tread, when mounted on a casing, comprising:

first, second and third circumferentially extending zones, the edges of the zones being parallel to the equatorial plane of the tire, the second zone being disposed between and contiguous with the first and third zone;

the width of the first zone being between 25% and 50% of the tread width, the width of the second zone being between 15% and 35% of the tread width, the width of the third zone being between 25% and 50% of the tread width;

the first zone having substantially aligned lateral wide groove segments extending across the width of the first zone, the lateral wide groove segments, over a majority of their length in the first zone, forming an angle between 70 degrees and 90 degrees with a plane in the first zone parallel to the equatorial plane, the second zone having substantially aligned lateral wide groove segments extending across the width of the second zone, the lateral wide groove segments, over a majority of their length in the first zone, forming an angle between 10 degrees and 45 degrees with a plane in the second zone parallel to the equatorial plane; and the third zone having substantially aligned lateral wide groove segments extending across the width of the third zone which are generally perpendicular to the lateral wide groove segments of the second zone, the lateral wide groove segments of the third zone, over a majority of their length in the third zone, forming an angle between 45 degrees and 70 degrees with a plane in the third zone parallel to the equatorial plane, provided that the angle of the lateral wide groove segments of the third zone are smaller than the angle of the lateral wide groove segments of the first zone.

2. A tread as in claim 1 wherein the tread has wide grooves which intersect lateral wide grooves to form blocks, the blocks having a leading edge and a trailing edge, the leading edge of the blocks contacting the road surface prior to the trailing edge of the blocks when the tire is rotating in its forward direction, the leading edge of the blocks in the first zone being wider than the trailing edge of such blocks.

3. A tread as in claim 2 wherein the tread has a pattern of tread elements with a corresponding net-to-gross ratio, the net-to-gross ratio of each zone being at least 3% different than the other zones.

4. A tread as in claim 3 wherein the net-to-gross ratio of each zone is at least 5% different than the other zones.

5. A tread as in claim 1 wherein the net-to-gross ratio of the first zone is between 60% and 75%.

6. A tread as in claim 5 wherein the net-to-gross ratio of the first zone is between 60% and 70%.

7. A tread as in claim 6 wherein the net-to-gross ratio of the third zone is between 54% and 68%.

8. A tread as in claim 7 wherein the tread has a center of pressure, the center of pressure being disposed in the first zone.

9. A tread as in claim 1 wherein the width of the first zone is between 3 and 9 inches, the width of the second zone is between 1 and 6 inches, and the width of the third zone is between 3 and 9 inches.

10. A tread as in claim 1 wherein the lateral wide grooves of the first zone merge into the lateral wide grooves of the second zone.

11. A tread as in claim 10 wherein the lateral wide grooves of the third zone merge into the lateral wide grooves of the second zone.

12. A tread as in claim 2 wherein at least one block has the shape of a trapezoid.

* * * * *